A. T. NICHOLS.
CIRCULAR-SAWING MACHINES.
No. 7,871. Reissued Sept. 4, 1877.
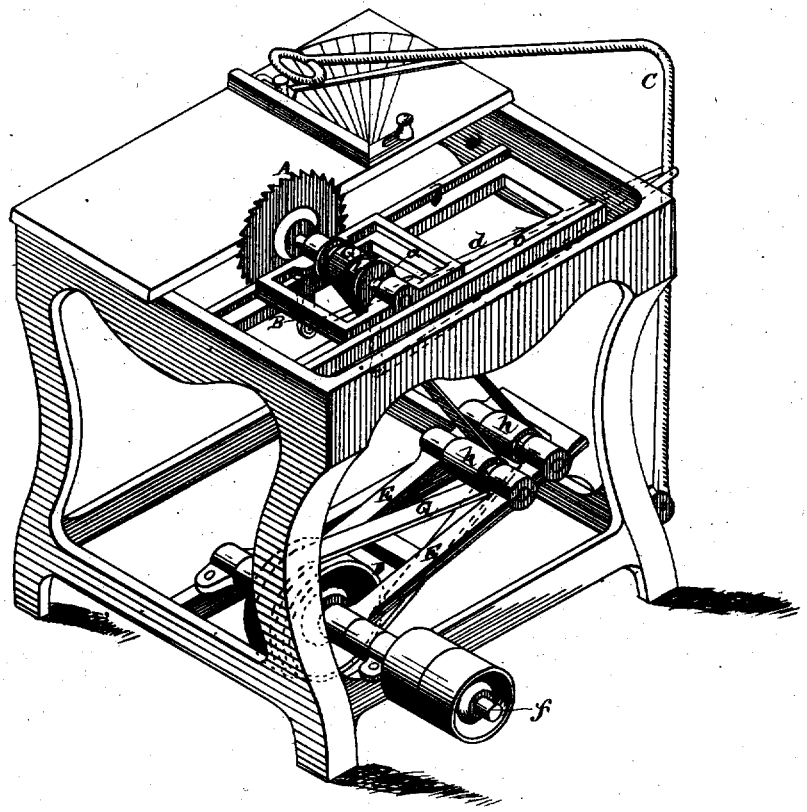
WITNESSES
Henry N. Miller
Wm. K. Galt
INVENTOR
Albert T. Nichols,
Francis Hueson
ATTORNEYS
N. PETERS, PHOTO-LITHOGRAPHER, WASHINGTON, D. C.

UNITED STATES PATENT OFFICE.

ALBERT T. NICHOLS, OF WILLIAMSPORT, PENNSYLVANIA.

IMPROVEMENT IN CIRCULAR SAWING MACHINES.

Specification forming part of Letters Patent No. 166,887, dated August 17, 1875; Reissue No. 7,871, dated September 4, 1877; application filed August 16, 1877.

*To all whom it may concern:*

Be it known that I, ALBERT T. NICHOLS, of Williamsport, in the county of Lycoming and State of Pennsylvania, have invented certain new and useful Improvements in Circular Sawing Machines; and I do hereby declare that the following is a full, clear, and exact description thereof, reference being had to the accompanying drawing, and to the letters of reference marked thereon, which form a part of this specification.

The nature of my invention consists in the construction and arrangement of a belt-strainer or self-tightener for that class of sawing-machines in which the saw-arbor is mounted upon a movable carriage or stationary arbor, but more particularly for the movable carriage, as will be hereinafter more fully set forth.

In order to enable others skilled in the art to which my invention appertains to make and use the same, I will now proceed to describe its construction and operation, referring to the annexed drawing, which represents a perspective view of a sawing-machine embodying my invention.

A represents the circular saw, mounted upon the arbor *a*, which has its bearings in a carriage, B, movable back and forth upon slides *b b*. The carriage B may be moved back and forward by any well-known means; but I prefer to operate it by the lever *c*, connected with the carriage by a rod, *d*, as shown.

*f* is the driving-shaft, having its bearings in the frame of the machine, or they may be placed on or under the floor. This shaft receives its motion from the engine by a belt, in any suitable manner.

On the shaft *f* is a pulley, D, around which the belt is passed. E E are two arms, suitably hinged at one end and free at the other end, the outer ends of the arms being rigidly connected together, and two pulleys, *h h*, are arranged between said arms, with their journal-bearings in them, near the outer ends.

In the drawing, I have represented the arms as being placed loosely on or hinged to the shaft *f*; but it is evident that said arms may be otherwise hinged near the shaft, so that their outer ends are free, and operate in the same manner and with the same effect as though hinged to the shaft. It is, however, preferable to hinge the arms to the shaft, as shown.

G represents an endless belt passing around the pulley D, then under the two pulleys *h h*, and up and around a pulley, *i*, on the saw-arbor *a*.

The band being of proper length, the arms E lie horizontal, or nearly so, before the saw starts forward to its work, and the weight of the pulley *h* and arms E always keeps the belt at the proper tension to rotate the saw, and the belt-strainer thus constructed adjusts itself to correspond with the movement of the saw-carriage.

This device is simple, cheap, and effective for the purpose for which it is intended, and it is not liable to get out of order.

If necessary, weights may be placed on the outer ends of the arms E.

Having thus fully described my invention, what I claim as new, and desire to secure by Letters Patent, is—

1. The arms E E, hinged at one end and free at the other end, and provided with the pulleys *h h*, in combination with the saw-carriage, saw-mandrel, driving-shaft, and endless belt, for the purposes herein set forth.

2. The arms E E, hinged at one end and free at the other end, and having pulleys *h h*, the belt G passing around the pulley D on the driving-shaft, around the pulleys *h*, and around the saw-mandrel, in combination with the movable saw-carriage and mechanism, substantially as described, or its equivalent, for reciprocating said carriage, all substantially as and for the purposes herein set forth.

In testimony that I claim the foregoing I have hereunto set my hand this 13th day of August, 1877.

ALBERT T. NICHOLS.

Witnesses:
A. J. DIETRICK,
E. D. DIETRICK.